Dec. 23, 1930.   C. L. MEISTER ET AL   1,785,839
SPEED CHANGING DEVICE
Filed Dec. 5, 1929   2 Sheets-Sheet 1
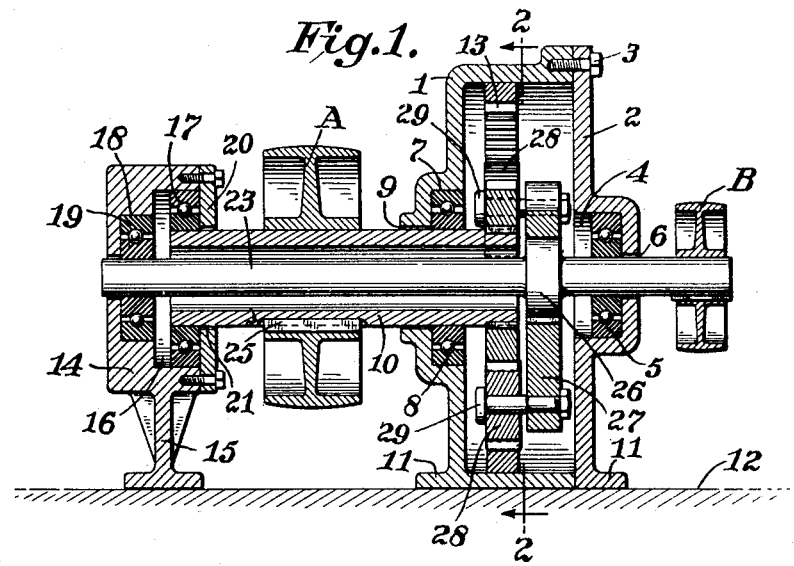
  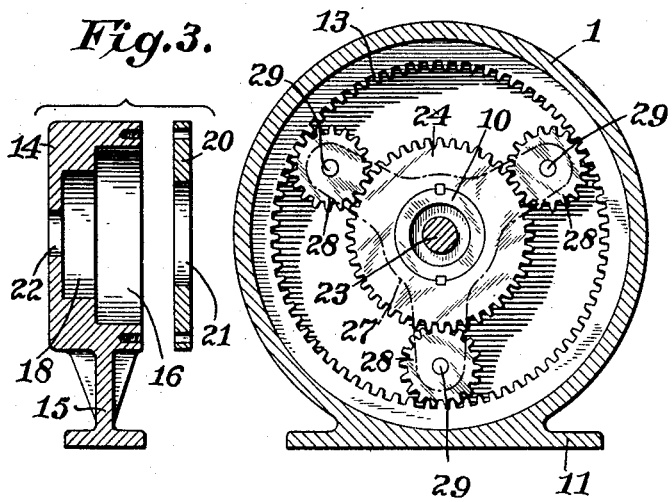  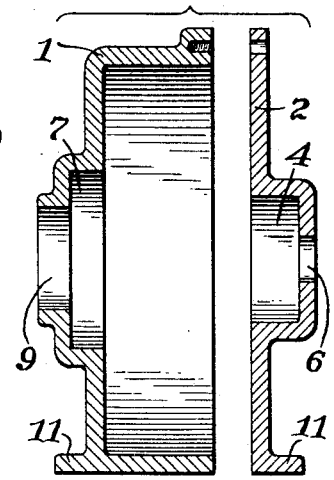
Inventors:
Conrad L. Meister,
Charles R. Sugg,
By Parker Cook  Atty.

Dec. 23, 1930.        C. L. MEISTER ET AL        1,785,839
SPEED CHANGING DEVICE
Filed Dec. 5, 1929        2 Sheets-Sheet 2
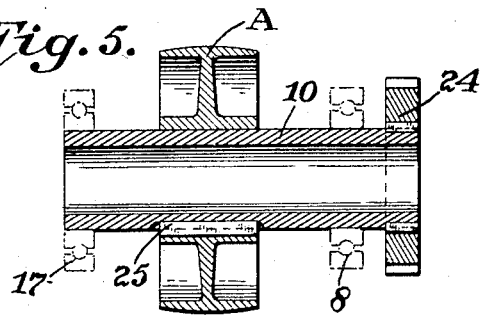
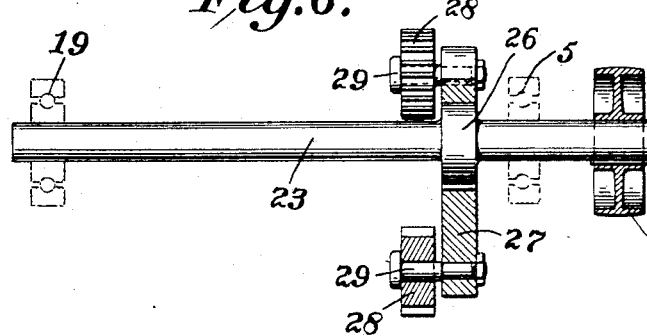
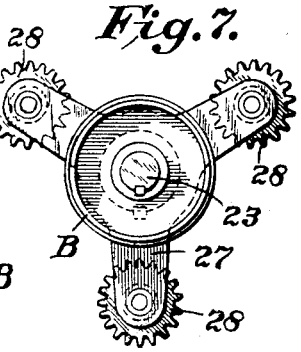
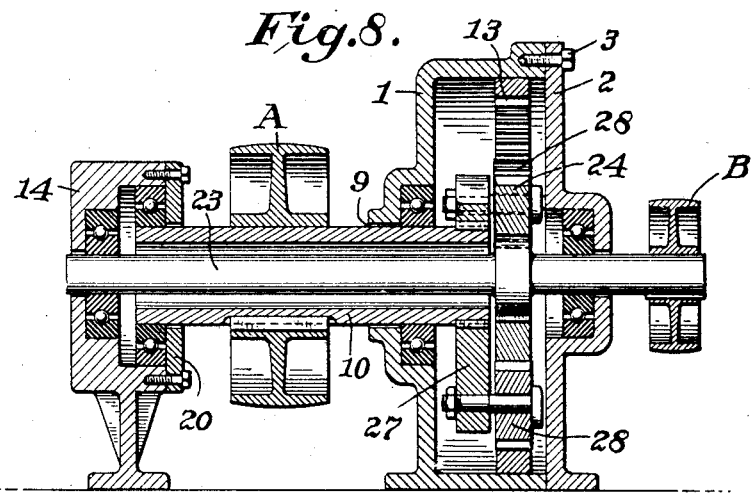
Inventors:
Conrad L. Meister,
Charles R. Sugg,
By Parker Cook Atty.

Patented Dec. 23, 1930

1,785,839

UNITED STATES PATENT OFFICE

CONRAD L. MEISTER AND CHARLES R. SUGG, OF WILMINGTON, NORTH CAROLINA

SPEED-CHANGING DEVICE

Application filed December 5, 1929. Serial No. 411,850.

Our invention relates to new and useful improvements in speed changing devices and has for an object to provide a speed changing device that will be extremely compact in form, efficient in service, easy to assemble, and relatively cheap to manufacture.

Another object of the invention is to provide a speed changing device whereby it may be used as a speed reducer or, in other words, a reduction gear or, if desired, with but a slight change in the arrangement of the parts, the device may be used for stepping up the ratio of the power transmitting mechanism.

Still another object of the invention is to provide a speed changing device wherein there is a hollow shaft and a solid shaft, which are designed to travel at different rates of speed, so that in the preferred form, for instance, the hollow shaft may be the hollow shaft of a rotor of a motor, through which will extend the solid shaft, and the parts so arranged that the high speed of the rotor shaft will be transmitted through the low speed solid shaft, to which latter will be connected the object to be driven.

Still another object of the invention is to provide a speed changing device comprising a hollow shaft and a solid shaft wherein the one fits within the other, so that if used for instance with a hollow shaft motor, the speed changing device will occupy but little additional space.

Still another object of the invention is to provide a speed changing device that may be either used to increase or decrease the speed ratio, there being but a slight change in the form of the device when used in either of the above manners.

Still another object of the invention is to provide a speed changing device, wherein each shaft will be supported at its opposite ends by a bearing to thus obtain a more rigid, rugged and durable combination than the general form of speed changing devices now possess.

With these and other objects in view, the invention consists in certain new and novel arrangements and combination of parts, as will be hereinafter more fully described and pointed out in the claims.

Referring now to the drawings showing a preferred and modified form,

Fig. 1 is a vertical sectional elevation showing our improved speed changing device;

Fig. 2 is a sectional view taken on the line 2—2 of Fig. 1 and showing the arrangement of the spider and its planetary gears;

Fig. 3 is a sectional view showing a rear housing;

Fig. 4 is a sectional view showing the arrangement of the forward housing;

Fig. 5 is a detail view of the hollow high speed shaft showing a driving pulley thereon, the sun gear mounted on the end of the shaft and the bearings for supporting the shaft;

Fig. 6 is a detail view of the solid shaft and its cooperating parts;

Fig. 7 is a front view of the shaft showing the spider and its planetary gears, three of which are shown in the drawings, but more or less may be used as desired; and Fig. 8 is a modified form showing the device arranged to step up the speed ratio rather than step it down.

At the outset, it might be mentioned that the several views showing our improved speed changing device illustrate the invention as horizontally mounted for service, but it is to be distinctly understood that the same may be just as easily arranged for vertical mounting, it being only necessary to slightly change the lugs or feet on the housings and to add say collars or thrust bearings or coupling attachments.

Referring now to the preferred form, there is shown a housing 1, which may be a casting of the desired size and shape, to which there may be bolted the cover plate 2, the bolts preferably being situated in the periphery of the plate, as at 3, to thus extend into the walls of the casing 1. The casing is preferably circular and is of sufficient width to receive the gears that will shortly be mentioned.

The cover plate 2 may have the small chamber 4 centrally thereof, which chamber will have fitted therein a suitable bearing 5 and, of course, there will be an opening 6 through which the end of the solid shaft, shortly to be mentioned, will project. In a like manner, the rear of the casing 1 may have the small chamber 7 centrally thereof, in which will be fitted suitable bearings 8 and the chamber 7 will also have the opening 9 through which the hollow shaft 10 will project, which shaft likewise will shortly be described in detail.

The casing 1 and the cover plate 2 may have the feet 11 formed as illustrated and these feet will be secured to a base which is represented by a line 12. Of course, the base may be of any nature and when the device is horizontally mounted, both casings will be properly aligned and securely held in position. As before mentioned, if the casing were to be mounted for vertical service, the arrangement of the feet on the casing might be slightly different. In other words, the attaching means of the casing or where the same is to be bolted is a matter of design and any preferred detail of arrangement might be used.

We have not illustrated the device in vertical position, but the transposition is so obvious it will be understood from the above description.

Now before leaving the description of this forward casing, there will be noticed there is a ring gear 13 or what is often spoken of as an internal gear, tightly fitted about the inner wall of the casing and this may be held in place by screws (not shown) or in any other desirable manner.

Taking up the rear casing 14 clearly shown in Figs. 1 and 3, it will be noticed that in a like manner there is a base 15, while the body of the same has formed therein the chamber 16 to receive the bearing 17, while a smaller chamber 18 will receive the smaller sized bearing 19. There will also be a cover plate 20, which may be secured to the casing, which plate will have the bore 21 formed therein, through which will pass the hollow shaft 10.

In a like manner, centrally of the rear wall of the casing, there is another bore 22, through which the rear end of the solid shaft 23 may extend, if desired to apply another pulley like B (not shown). The casing 14 is also to be secured to a base or foundation 12 if the device is to be used in its horizontal position or might be provided with other wings or lugs (not shown) to secure the same in a vertical position.

Having described the casings, reference now might be made to Figs. 1 and 5 to understand the construction of the hollow shaft 10 and its associated parts.

This hollow shaft 10 may be the central rotor shaft of a motor and some of the motors today are built with a hollow shaft of this nature. Keyed to one end of the shaft is the sun gear 24, which is used to drive the planet gears, shortly to be mentioned. On this shaft 10 is mounted the high speed driving pulley A, which it will be understood might be the rotor of a motor, a gear wheel or any form of transmitting means, and the structural detail shown of this pulley A is simply illustrative. In Figs. 1 and 5, we have shown this driving pulley as being keyed, as at 25, which is also only illustrative of showing one form of means for fastening this driving pulley to the hollow shaft.

Referring to Fig. 1 for the moment, it will be seen that the rear end of the hollow shaft 10 rests within the bearing 17 which, as has been previously mentioned, is fitted within the housing 14, while the other end of the hollow shaft 10 is mounted within the bearing 8, which latter fits within the chamber 7 of the forward housing 1. Therefore, we have the hollow shaft 10 mounted for rotation within the two housings and thus supported near its opposite ends.

Now referring to the solid shaft 23, which is shown more in detail in Fig. 6, it will be seen that it is provided with the integral collar 26, on which there is keyed the spider 27 which, in turn, is provided with the planet gears 28 mounted respectively on their studs 29, while on the outer end of the shaft 23 may be the slow speed driven pulley B.

Referring back to Fig. 1 for the moment, it will be seen that this solid shaft extends through the hollow shaft and has its rear end mounted within the heretofore mentioned bearing 19, while its forward end is mounted within the bearing 5.

The sun gear 24 meshes with these planets 28 which, in turn, mesh in the ordinary way with the ring or internal gear 13.

In assembling the device, we can, by varying the number of teeth in the ring gear, and the number of teeth in the sun gear, selecting suitable planet gears to properly mesh with them, procure different ratios as desired.

Describing the operation as far as the specification has proceeded, when A is used as the high speed driving pulley, then the sun gear revolving at a high rate of speed or, in other words, at the speed of transmitting power and hollow shaft will force the planets mounted on the spider around the ring at a reduced rate and as, it will be remembered, the planets are mounted on the solid shaft, the solid shaft 23 will turn at the reduced rate within the hollow shaft and the slow speed pulley B will thus travel at the reduced speed. It will also be understood that if the pulley B were to be made the rotating power transmitting means, then the pulley A would be the driven pulley and the speed ratio would be stepped up rather than stepped down.

Referring now to the slightly modified form, as illustrated in Fig. 8, it will be seen that the only difference is that the spider 27 in this instance is keyed to the hollow shaft 10, rather than to the solid shaft 23, as in the preferred form, and the sun gear 24 is, in this instance, secured to the solid shaft 23 rather than to the hollow shaft 10, as in the preferred form. The ring or internal gear 13 is positioned properly in the casing, so that the planets 28 will be in mesh therewith.

Supposing now the driving pulley A which, in this instance, will be the slow speed pulley, be the rotor of a motor or a gear wheel or other transmitting means, then the rotation of the spider and the planets will drive the sun gear 24 at a higher ratio, so that now the driven pulley B will be travelling at a higher speed than the driving pulley A. In a like manner, the high speed pulley B might be the rotating power transmitting means and then the pulley A would be driven at a reduced rate of speed.

It will also be noticed that even in this form, the mounting of the shafts are identical, that is, the hollow shaft is securely supported at both its ends by bearings and, in a like manner, the solid shaft is securely supported which, therefore, provides a rigid and strong construction and prevents any "whip" or pounding of the shafts.

From the foregoing, it will be seen that we have provided a highly efficient speed changing device wherein a solid shaft is rotating within a hollow shaft and at a different rate of speed and wherein the hollow shaft, if so desired, may be the shaft of a motor, so that the addition of the speed changing device to a motor will take up but little room.

It will also be seen that the speed changing device is positive in action, does away with all worm and worm wheels that are so often used in speed reducing devices and, at the same time, the few simple planetary parts may be encased within relatively small housings.

Of course, the device may be made in large or small sizes, depending on the kind of work to be done and depending on what sized motor it is to be used with.

Finally, it will be seen that the device may be used either as a speed reducing mechanism or as a speed increasing mechanism with but a slight transposition of parts.

Many slight changes might be made without in any manner departing from the spirit and scope of the invention.

Ball bearings have been shown on the drawings and referred to herein, but any type of bearing suitable for any specific application may be used.

Having thus described our invention, what we clam as new and desire to secure by Letters Patents is:—

1. A speed changing device comprising a hollow shaft, a solid shaft extending therethrough, and independently supported in bearings located beyond the ends of the hollow shaft, a ring gear, sun gear, and planet gears, said sun gear, planets, and ring gear associated with said hollow shaft and said solid shaft, said ring gear held against movement and said solid shaft adapted to revolve at a different rate of speed within said hollow shaft.

2. In a speed changing device, a hollow shaft, bearings supporting said hollow shaft, a solid shaft extending within said hollow shaft and bearings supporting said solid shaft and said bearings being independent of the bearings of the hollow shaft, a planetary gearing system comprising a ring gear, sun gear and planets, and the sun gear and planets associated with said hollow shaft and said solid shaft, whereby a rotation of the one shaft will cause a rotation of the other shaft and at a different speed, depending upon the number of teeth that the sun gear bears to the ring gear.

3. A speed changing device comprising a hollow shaft and a solid shaft extending therethrough, and both mounted for rotary movement and the supports for the solid shaft being independently located with respect to those of the hollow shaft, a planetary gearing system associated with said shafts whereby a rotation of said hollow shaft will rotate said solid shaft, and at a different rate of speed.

4. A speed changing device comprising two casings, a hollow shaft mounted near its opposite ends in said casings and a solid shaft mounted near its opposite ends in each casing and extending within said hollow shaft and the bearings of the solid shaft being independent of the bearings of the hollow shaft, a planetary gearing system associated with said shafts, the ring gear of the system held against rotation in one of said casings, whereby a rotation of one shaft will cause a rotation of the other shaft and at a changed rate of speed.

5. A speed changing device comprising two casings, a hollow shaft supported near its ends in each casing and a solid shaft mounted near its ends in each casing, the solid shaft extending within the hollow shaft, a ring gear mounted against rotation in one of said casings, a sun gear mounted on said hollow shaft and a spider and planet gears mounted on said solid shaft, the planets meshing with said sun and ring gears, whereby a rotation of the hollow shaft will cause the solid shaft to rotate, at a changed rate of speed.

6. A speed changing device comprising two casings, suitable bearings mounted in each of said casings, a hollow shaft and a solid shaft mounted in each of said bearings and the solid shaft within said hollow shaft, a ring gear in one of said casings, a sun gear mounted on said hollow shaft and a spider mounted on said solid shaft provided with planet gears, said planet gears meshing with said ring gear and said sun gear operating said planets whereby the solid shaft revolves at a changed rate of speed within said hollow shaft.

7. A speed changing device comprising a hollow shaft, a second shaft extending therethrough, both of said shafts supported near their opposite ends and supported for rotation and the supports for the hollow and solid shafts being independent of each other, a planetary system associated with said shafts and the said parts of the planetary system reversible whereby the hollow shaft may be made to revolve at a different rate of speed than the second shaft.

8. A speed changing device comprising two casings, each of said casings provided with chambers and suitable bearings in said chambers, a hollow shaft mounted within said bearings and a solid shaft also mounted within other of said bearings, the solid shaft extending through the hollow shaft, a ring gear within said casing and a sun gear and planets associated with said hollow and solid shafts whereby a rotation of one shaft will cause a rotation of the other of said shafts but at a different rate of speed.

9. A speed changing device comprising two shafts mounted for rotation and one within the other, two housings, each of which is provided with bearings for supporting the hollow shaft and further bearings for independently supporting the solid shaft, a sun gear on one of said shafts and the other of said shafts provided with a spider, planet gears mounted on said spider, a ring gear, said planets meshing with the sun gear and ring gear and said spider and said sun gear capable of being transposed with relation to the shafts to which they are secured, whereby the device may be either a speed reducer or a speed increaser.

In testimony whereof we affix our signatures.

CONRAD L. MEISTER.
CHARLES R. SUGG.